Nov. 12, 1963
G. KIVENSON
3,110,481
MAGNETIC SHAFT DAMPER
Filed Sept. 26, 1958
2 Sheets-Sheet 2
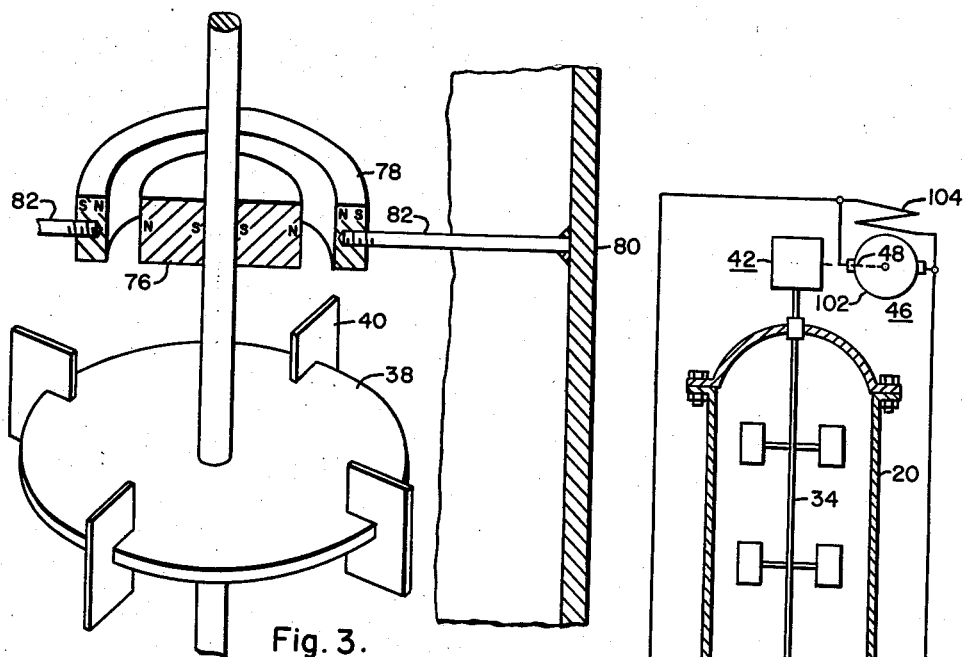
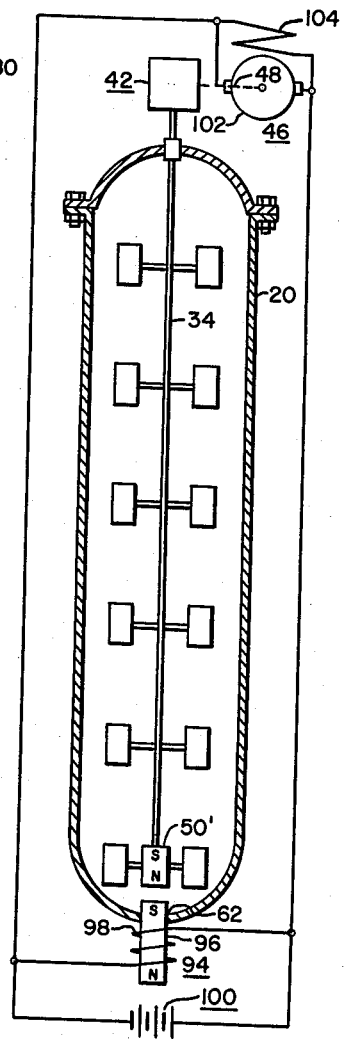
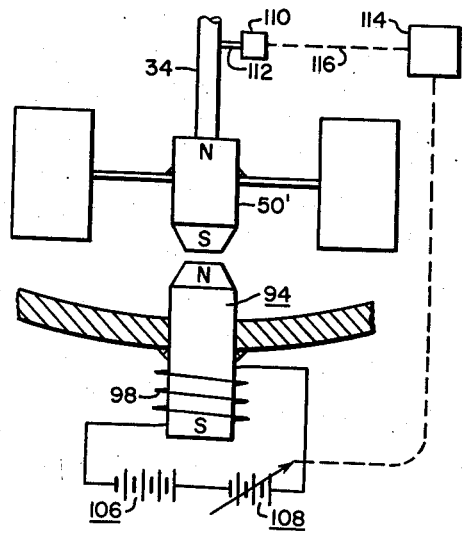
Fig. 3.
Fig. 6.
Fig. 5.

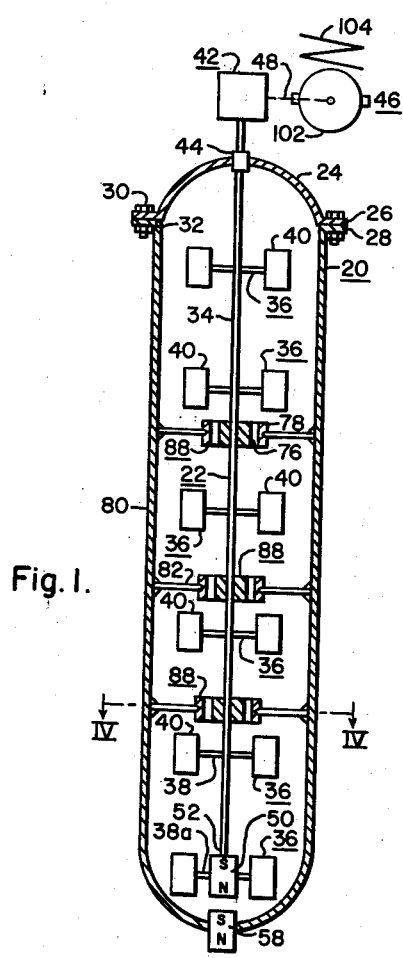

United States Patent Office 3,110,481
Patented Nov. 12, 1963

3,110,481
MAGNETIC SHAFT DAMPER
Gilbert Kivenson, Pittsburgh, Pa., assignor to Westinghouse Electric Corporation, East Pittsburgh, Pa., a corporation of Pennsylvania
Filed Sept. 26, 1958, Ser. No. 763,706
9 Claims. (Cl. 259—107)

The present invention relates to means for damping vibration and whip in a rotating drive shaft or the like and more particularly to an arrangement for reducing whip in an elongated shaft supported at one end.

The invention disclosed herein is adapted for use in one application thereof with elongated generally vertical shafts, such as are employed in certain types of mixing vessels. For maintaining slurries and the like in suspension, these vessels frequently are made rather long or high as compared with their diameters in order to obtain efficient mixing of the slurries or suspension. Mixing vessels employed in handling nuclear fissionable materials are provided with such a configuration for the additional reason that the relatively small diameters of these vessels in comparison to their heights positively avoid accumulating a critical mass within the mixing vessel. For a given composition of fissionable material, the critical mass, of course, is a function of the diameter of the vessel. Similarly shaped mixing vessels, however, are employed in non-nuclear applications for the purpose of conserving floor space or the like.

As a result of the mixing shaft being suspended at its upper end, shaft whip or vibration develops when the speed of the shaft is increased beyond a predeterminable value. Shaft whip can cause serious damage to the bearing or packing disposed at the point of entry of the shaft into the vessel and also to gearing mechanisms and the necessary supporting bearings associated with the outward or upward end of the shaft. At a higher shaft speed usually referred to as the critical speed, shaft whip reaches a maximum, and vibration damage caused thereby is most severe. If the critical speed is exceeded, the vibration lessens, and normal operation can be maintained. In operating the mixing vessel, however, it is necessary to pass through the critical speed region when starting up and shutting down the mixing apparatus. At such times wear upon moving or engaging parts of the vessel is severe and, additionally, in many mixing applications, particularly when dealing with the aforesaid nuclear materials, speeds resulting in even momentary shaft whip cannot be tolerated due to the likelihood of leakage of hazardous materials or the like.

It is known, of course, that the aforesaid vibration can be reduced and the critical shaft speed increased by providing mechanical bearings along the length of the shaft. The use of mechanical bearings in many suspensions or solutions handled by mixing apparatus is rather undesirable because these suspensions and solutions are abrasive or corrosive. Even in those applications where the fluid is not abrasive or corrosive, the latter is usually not a good bearing lubricant.

The problems indicated previously, of course, can be relieved to some extent by providing the mixing shaft with a large enough diameter to resist torsional vibration. This solution is limited on the other hand by the space required by the mixing impellers and by the weight carrying capacity of the supporting bearings associated with the driving shaft.

It has been proposed also to reduce vibration in the mixing shaft by the use of concentric counter-rotating shafts. This arrangement, however, limits the number of mixing impellers to two, each of which is mounted adjacent the bottom of its respective driving shaft. In addition to its relatively poor mixing capacity or ability in many applications, the latter arrangement is complicated and expensive.

It is contemplated, of course, that at least certain features of the invention can be employed with equal facility in other applications involving the use of rotating shafts, for example, in the elimination of whip or vibration from various overhead driving shafts or the like employed in many industrial applications.

It is, therefore, an object of the invention to provide novel and efficient means for reducing or eliminating vibration or whip in a rotating driving shaft.

Another object of the invention is the provision of means for magnetically damping the vibrations occurring in a rotary driving shaft during operation thereof.

Still another object of the invention is the provision of a magnetic vibration damping arrangement wherein the damping action is varied in accordance with the speed of the driving shaft.

A further object of the invention is the provision of a magnetic vibration damping arrangement for a rotary shaft wherein the damping action of the arrangement is augmented when the vibration to which the rotating shaft is subjected tends to increase.

Another object of the invention is the provision of a novel and efficient mixing vessel and agitating means therefor.

Yet another object of the invention is the provision of a mixing vessel of the character described and having novel magnetic damping means associated with its agitating means.

A further object of the invention is the provision of a mixing vessel of the character described having an elongated agitating means with magnetic damping means disposed at spaced locations along the agitating means for the reduction or elimination of vibration and whip.

In the course of the following detailed description of the invention the foregoing and additional objects, features and advantages of the invention will be made apparent. The description is taken in conjunction with the accompanying drawings, wherein:

FIGURE 1 is a longitudinally sectioned view of one form of mixing apparatus arranged in accordance with the invention;

FIG. 2 is an enlarged portion of the view shown in FIG. 1 showing in detail the lower portion of the mixing apparatus;

FIG. 3 is an enlarged perspective view of one of the radial magnetic dampers illustrated in FIG. 1;

FIG. 4 is an enlarged cross sectional view showing the mixing apparatus of FIG. 1 and taken along reference lines IV—IV thereof;

FIG. 5 is a longitudinally sectioned view of another form of mixing apparatus arranged in accordance with the invention; and FIG. 6 is a partial longitudinally sectioned view of still another form of mixing apparatus contemplated by the invention.

Referring now to FIGS. 1 to 4 of the drawings, the exemplary form of the invention depicted therein comprises a mixing vessel 20 in which is suspended a mixing agitator denoted generally by the reference character 22. The vessel 20 in this arrangement is elongated in the vertical direction and is furnished with a relatively small diameter in relation to its height. A top closure 24 is provided for the vessel, and the closure 24 and vessel 20 are furnished with mating mounting flanges 26 and 28, respectively, which are secured by a plurality of bolts 30 in the well-known manner. Suitable sealing means not shown, for example, a sealing O-ring and groove, can be applied at the junction 32 between the top closure 24 and the vessel 20.

In this arrangement of the invention the agitator 22 comprises an elongated driving shaft 34 and a plurality of impellers or mixers 36 which are mounted at spaced locations along the length of the driving shaft 34. As better shown in FIGS. 2 to 4 of the drawings, each of the impellers 36 comprises a transversely mounted supporting disc 38 and a plurality of mixing vanes 40 secured to the outer periphery thereof.

With the arrangement of the invention as viewed in FIG. 1 of the drawings, the agitator 22 extends nearly to the bottom of the mixing vessel 20. The upward end of the driving shaft 34 protrudes through a central opening in the top closure 24 where it is joined to a supporting bearing and gearing train denoted generally by the reference character 42. At the point of passage of the driving shaft 34 through the top closure 24 a packing and radial bearing arrangement 44 of conventional design is mounted. The packing 44 is designed to prevent leakage into or out of the vessel 20. In this arrangement, the agitator 22 is rotated by a suitable driving mechanism, for example, the electric motor 46. The rotative speed of the motor 46 is reduced to a suitable mixing speed of the agitator 22 by the gearing train 42 to which the motor shaft 48 is coupled.

In order to reduce the level of shaft vibration or whip or to increase the critical speed of the driving shaft 34 at which shaft vibration is at a maximum, a magnet 50 is mounted at the lower end 52 of the driving shaft 34. Desirably, the magnet 50 is of the permanent type fabricated from a magnetic material, such as Alnico, an alloy of aluminum, nickel and cobalt. As better shown in FIG. 2 of the drawings, the magnet 50 is secured to the lower end 52 of the driving shaft by threading the driving shaft into the magnet 50 as denoted by the reference character 54. In this case, the lowermost impeller supporting disc 38A is secured to the outer periphery of the magnet 50, for example, by an annular structural weld 56.

A similar magnet 58 is fixed in the bottom wall portion 60 of the vessel 20 and extends partially through an opening 62 thereof. In the present arrangement of the invention the magnet 58 likewise is fabricated from an alloy such as Alnico and is sealed to the adjacent wall 60 by means of a relatively small annular sealing weld 64. The chief support for the magnet 58, however, desirably is directly by the vessel wall 60, for example, by shrink fitting the magnet 58 into the opening 62, in order to avoid producing a relatively large weld 64 and partially demagnetizing the magnet 58 as a result of the attendant heat.

In the arrangement shown in FIGS. 1 and 2, the magnets 50 and 58 are approximately the same size and configuration. In this example, the magnets 50 and 58 are provided in the form of right circular cylinders, although any convenient configuration can be adopted. The magnets 50 and 58 are polarized such that opposite poles are formed at their ends respectively and are arranged so that their confronting ends 66 and 68, respectively, are of opposite polarity. The magnets 50 and 58 are mounted in relation to the agitator 22 and the vessel bottom wall 60, respectively, so that a relatively small gap 70 exists between the magnets 50 and 58. The magnet 50 is positioned on the shaft 34 so that the geometric axis of the magnet corresponds with the true axis of rotation of the shaft 34. The magnet 58 is disposed so that maximum attraction between the magnets 50 and 58 is achieved when the shaft 34 is rotating evenly about the aforesaid axis.

In the operation of the invention as presently understood, it is readily seen that an attractive force exists between the magnets 50 and 58. During rotation of the agitator 22 it is assumed that a condition of incipient vibration or whip occurs in the driving shaft 34. As a result, the upper magnet 50 becomes slightly displaced from the axis of the lower magnet 58. Consequently, a restoring force-couple immediately is formed between the magnets 50 and 58 which tends to return the driving shaft end 52 to the true center of the shaft 34. The aforementioned force couple is augmented by chamfered end portions 72 and 74 of the magnets 50 and 58, respectively, which chamfered portions tend to concentrate the magnetic flux between the magnets closer to the longitudinal axis of the driving shaft 34.

In the event that the end damping afforded by the magnets 50 and 58 is insufficient in the case of rather elongated shafts, magnetic damping means for the driving shaft 34 are provided intermediate the ends thereof. In one arrangement of the invention, the intermediate or radial magnetic damping means comprises a cylinder 76 mounted on the outer surface of the shaft 34. The cylinder, for example, can be made in the form of a sleeve and secured to the driving shaft by shrink fitting. The cylinder 76 additionally is fabricated from a magnetic material such as that noted previously and is magnetized radially such that opposite magnetic poles are formed at the inner and outer peripheries, respectively of the cylinder 76 as better shown in FIG. 3. Surrounding the cylinder 76 is a ring member or annulus 78 likewise formed from a magnetic material and magnetized radially. The polarities of the magnets 76 and 78 are disposed such that the confronting surfaces of these magnets are of the same polarity; for example, the inner periphery of the ring member 78 and the outer periphery of the cylinder 76 are each of north polarity.

As shown in FIG. 4 of the drawings, the ring member 78 is rigidly secured to the adjacent wall portion 80 of the vessel 20 by a plurality of spokes or supporting rods 82. The spokes 82 can be secured to the vessel 20 and to the ring member 78 in any convenient manner; for example, the spokes 82 are threaded to the ring member 78 as denoted by the reference characters 84 and are secured to the vessel wall portion 80 by fillet welds 86.

The magnetic assembly 88 comprising the ring member 78 and the cylinder 76 is adjusted such that the position of minimum repulsion therebetween and the true axial rotational center of the driving shaft 34 coincide. Vibration of the driving shaft 34 when rotated tends to displace the shaft in a horizontal plane, as viewed in FIG. 1 of the drawings. A restoring force, therefore, is produced by the magnetic assembly 88 whenever the driving shaft 34 moves out of alignment with its normal rotational axis and this force acts to damp the vibration.

In the case of an extremely long driving shaft or agitator, it is contemplated that more than one magnetic assembly 88 can be spaced along the length of the driving shaft 34, and in the arrangement of the invention as shown in FIG. 1, three such magnetic assemblies 88 are employed. When employing shorter or stiffer driving shafts, the end magnetic assembly 90 including the magnets 50 and 58 need only be utilized.

When employing the magnetic assembly 50—58 of FIGS. 1 and 2, it has been found that severe whip is obtained in a shaft 5/16 inch in diameter and 16 inches long supported vertically at one end when a speed of about 100 r.p.m. is reached. This shaft was furnished with a ½ inch by ½ inch Alnico magnet at its lower end; however, the impeller or mixer was omitted. On the other hand, when a fixed ½ inch by ½ inch magnet was positioned and aligned adjacent the magnet affixed to the shaft end, it was found that whip would not occur until a speed of about 220 r.p.m. was obtained.

Referring now to FIG. 5 of the drawings, an arrangement in accordance with the invention is exemplified therein for the purpose of increasing the restoring force of an end magnetic assembly 50'—94 in accordance with the speed or load of the motor 46. The end magnetic assembly 50'—94 is similar to the assembly 50—58 described heretofore with the exception that the magnet 50' thereof, which is secured to the lower end of the driving shaft 34, functions in cooperation with an electromagnet 94. The electromagnet comprises a core 96 fabricated from a magnetic material such as carbon steel, silicon steel or magnetic stainless steel and is partially inserted through the bottom opening 62 of the mixing vessel 20. A magnetizing winding 98 is wound upon the core 96 and is coupled electrically in parallel to a source of preferably direct potential 100 and to the rotor 102 and stator 104 of the electric motor 46. The source of potential 100 desirably is made variable in order to control the speed of the direct current motor 46. At the same time, however, the current and resultant magnetic flux associated with the electromagnet 94 is varied in proportion, since the electromagnet 94 is connected in parallel with the motor 46. Therefore, as the speed of the motor 46 is increased by manipulation of the source 100, a greater restoring force is imparted to the lower end of the driving shaft 34. Consequently, the increasing tendency of the shaft 34 to whip at higher rotative speeds is counteracted by a stronger restoring force of the electromagnet 94. It is contemplated in the case of relatively long shafts that one or more magnetic assemblies 88 (FIG. 1) can be employed in conjunction with the electromagnet 94 of FIG. 5.

Referring now to FIG. 6 of the drawings, another arrangement for adjusting the restoring force of the end magnetic assembly 50'—94 is illustrated therein. In this arrangement, the assembly 50'—94 likewise comprises the end magnet 50' and the electromagnet 94, both of which have been described previously. The coil 98 of the electromagnet 94 in this arrangement is coupled in series with a fixed source 106 of electric potential and a variable potential source 108. The sources 106 and 108 are preferably of the unidirectional type.

A vibration sensitive transducer 110 is mounted by suitable means (not shown) with its pickup rod or member 112 in contact with, or very nearly in contact with, the driving shaft 34. Although the transducer 110 is shown in FIG. 6 as being mounted adjacent the lower end of the shaft 34, obviously it can be mounted at other convenient positions along the length of the shaft. The transducer 110 is adapted to translate vibration of the shaft 34 into a correspondingly proportional electric output. This output, which is relatively minute, is fed to a conventional amplifier 114 as denoted by dashed lines 116. The output of the amplifier 114 is rectified to furnish or otherwise control the potential of the variable source 108 as indicated by the dashed lines 116. The arrangement, whereby a weak signal is employed to control a relatively large D.C. voltage, is well known, and, therefore, a detailed description is deemed unnecessary. Suitable forms of vibration transducers are described and claimed in Patents 2,571,899, 2,534,918 and 2,724,971, issued October 16, 1951, December 19, 1950, and November 29, 1955, to H. M. Kroft et al., and assigned to the assignee of the present application. Still another transducer adaptable for the arrangement of FIG. 6 is disclosed and claimed in Patent 2,770,741, issued November 13, 1956, to M. P. Vore et al., entitled "Vibration Pickup," and assigned to the present assignee.

With the arrangement shown in FIG. 6, the electromagnet 94 is energized during operation of the mixing apparatus at a minimum level as determined by the potential of the fixed source 106. As vibration or whip of the shaft 34 increases, however, the potential applied to the electromagnet 94 likewise increases as the potential of the adjustable voltage source 108 is increased by the vibration transducer 110. Thus, a tendency to increase in vibration of the shaft 34 is met by increased level of energization in the electromagnet 94. Accordingly, a large restoring force is imparted to the free end of the driving shaft 34 in the event that vibration thereof increases. It is contemplated, of course, that one or more magnetic assemblies 88 (FIG. 1) can be utilized in conjunction with the electromagnet 94 of FIG. 6.

The previous detailed description of the invention discloses novel and efficient forms of magnetic shaft damping arrangements. This descriptive material is employed merely by way of exemplifying the invention and is not intended to be limitative thereof.

Numerous embodiments and modifications of the invention will occur to those schooled in the art without departing from the spirit and scope of the invention. Moreover, it is obvious and it is so intended that certain forms of the invention can be employed without a corresponding usage of other forms or features thereof.

Accordingly, what is claimed as new is:

1. A magnetic damping arrangement for use with an elongated driving shaft, the combination comprising dynamoelectric means for rotating said shaft, a magnet secured to an end of said shaft, an electromagnet, means for mounting said electromagnet in proximity to said first-mentioned magnet, said electromagnet and said magnet being aligned with the axis of rotation of said shaft, said electromagnet having an energizing winding connected in electrical parallel with said dynamoelectric means and capable of being coupled to a source of direct potential to cause current to flow through said dynamoelectric means and said winding so that a change in energization of said dynamoelectric means changes the energization of said electromagnet.

2. A magnetic damping arrangement for use with an elongated driving shaft, the combination comprising dynamoelectric means for rotating said shaft, a magnet secured to an end of said shaft, an electromagnet, means for mounting said electromagnet in proximity to said first-mentioned magnet, said electromagnet and said magnet being aligned with the axis of rotation of said shaft, a source of variable direct potential, said electromagnet having an energizing winding connected in electrical parallel with said dynamoelectric means and with said source to cause current to flow through said dynamoelectric means and said winding so that the energization of said electromagnet is increased with the speed of said dynamoelectric means and said shaft.

3. A magnetic damping arrangement for use with an elongated driving shaft, the combination comprising dynamoelectric means for rotating said shaft, a magnet secured to an end of said shaft, an electromagnet, means for mounting said electromagnet in proximity to said first-mentioned magnet, said electromagnet and said magnet being aligned with the axis of rotation of said shaft, said electromagnet having an energizing winding capable of being coupled to a variable source of electric potential, a vibration transducer capable of producing an electrical output corresponding to the amount of vibration imparted thereto, means for mounting said transducer at a position whereat said transducer is engageable with said driving shaft, and amplifying circuitry capable of being coupled to said source for causing said output to vary said source so that the energization imparted to said electromagnet varies with the vibration of said shaft.

4. A magnetic damping arrangement for use with an elongated driving shaft, the combination comprising dynamoelectric means for rotating said shaft, a magnet secured to an end of said shaft, an electromagnet, means for mounting said electromagnet in proximity to said first-mentioned magnet, said electromagnet and said magnet being aligned with the axis of rotation of said shaft, a fixed potential source and a variable potential source, said electromagnet having an energizing winding connected in electrical series to said fixed potential source and to said variable potential source, a vibration transducer capable of producing an electrical output proportional to the amount of vibration imparted thereto, means for mounting said transducer at a position whereat it is engageable with said driving shaft, amplifying circuitry coupled to said transducer and to said variable source for causing said transducer output to vary the output of said variable source so that said electromagnet is energized in proportion to the amount of vibration of said driving shaft but above a minimum level of energization as determined by said fixed source.

5. A mixing apparatus comprising a vessel, an elongated driving shaft suspended within said vessel and extending adjacent the bottom wall of said vessel, agitating means secured to said driving shaft, means engaging the upper end of said shaft for supporting said shaft, dynamoelectric means coupled to said shaft for rotating said shaft, a magnetic member secured to the lower end of said shaft, an electromagnet secured to said bottom wall and disposed in proximity to said magnetic member, said electromagnet and said magnetic member being aligned with the axis of rotation of said shaft, said electromagnet having an energizing winding connected in electrical parallel with said dynamoelectric means and capable of being coupled to a source of direct potential to cause current to flow through said dynamoelectric means and said winding so that an increase in energization of said dynamoelectric means increases the energization of said electromagnet.

6. A mixing apparatus comprising a vessel, an elongated driving shaft suspended within said vessel and extending adjacent the bottom wall of said vessel, agitating means secured to said driving shaft, supporting means engaging said shaft adjacent the upper end thereof for supporting said shaft, dynamoelectric means coupled to said shaft for rotating said shaft, a magnetic member secured to the lower end of said shaft, a second magnetic member extending through an opening in said bottom wall and protruding outwardly of said vessel, said second magnetic member in addition extending into proximity to said first-mentioned magnetic member, said magnetic member being aligned with the axis of rotation of said shaft, said second magnetic member having an energizing winding engaging the outwardly protruding portion thereof and connected in electrical parallel with said dynamoelectric means and capable of being coupled to a source of direct potential to cause current to flow through said dynamoelectric means and said winding so that an increase in energization of said dynamoelectric means increases the energization of said second magnetic member.

7. A mixing apparatus comprising a vessel, an elongated driving shaft suspended within said vessel and extending adjacent the bottom wall of said vessel, agitating means secured to said driving shaft, means engaging the upper end of said shaft for supporting said shaft, dynamoelectric means coupled to said shaft for rotating said shaft, a magnetic member secured to the lower end of said shaft, an electromagnet secured to said bottom wall and disposed in proximity to said magnetic member, said electromagnet and said magnetic member being aligned with the axis of rotation of said shaft, at least one cylindrical magnet secured to said driving shaft intermediate its ends, a ring magnet for said cylindrical magnet, means for securing said ring magnet to a wall portion of said vessel at a position normally concentrically of said cylindrical magnet, said cylindrical and said ring magnets being disposed coaxially of said axis and being polarized so that identical magnetic poles are formed at their confronting surfaces, whereby vibration and whip in said shaft are reduced during operation of said shaft and said agitating means, said electromagnet having an energizing winding connected in electrical parallel with said dynamoelectric means and capable of being coupled to a source of direct potential to cause current to flow through said dynamoelectric means and said winding so that an increase in energization of said dynamoelectric means increases the energization of said electromagnet.

8. A mixing apparatus comprising a vessel, an elongated driving shaft suspended within said vessel and extending adjacent the bottom wall of said vessel, a plurality of agitating means secured to said driving shaft and spaced along the length thereof, means engaging the upper end of said shaft for supporting said shaft, dynamoelectric means coupled to said shaft, a magnetic member secured to the lower end of said shaft, an electromagnet secured to the bottom wall of said vessel and disposed in proximity to said magnetic member, said electromagnet and said magnetic member being aligned with the axis of rotation of said shaft, a plurality of generally cylindrical magnets spacedly mounted on said shaft at positions alternating with said agitating means, a like number of ring magnets, means for securing said ring magnets to wall portions of said vessel at positions normally concentrically of said cylindrical magnet, respectively, said cylindrical and said ring magnets being disposed coaxially of said axis and being polarized so that identical magnetic poles are formed at their confronting surfaces, said electromagnet having an energizing winding connected in electrical parallel with said dynamoelectric means and capable of being coupled to a source of electrical potential to cause current to flow through said dynamoelectric means and said winding so that an increase in energization of said dynamoelectric means increases the energization of said electromagnet.

9. A mixing apparatus comprising a vessel, an elongated driving shaft freely suspended from the upper end thereof and extending into said vessel to a position adjacent the bottom wall of said vessel, a plurality of agitating means secured to said driving shaft at positions intermediate the ends of said shaft and spaced along the length thereof, means coupled to said upper end of said shaft for supporting and rotating said shaft, a first magnet secured to the other end of said shaft, a second magnet secured to said bottom wall and disposed in proximity to said first magnet, said magnets each being aligned with the axis of rotation of said shaft and being so polarized that opposite magnetic poles are formed at their confronting surfaces, respectively, a plurality of cylindrical magnets secured to said driving shaft at positions alternating with said agitating means and intermediate the ends of said shaft, a like number of ring magnets, means for securing said ring magnets to a wall portion of said vessel at positions normally concentrically of said cylindrical magnets respectively, said cylindrical and said ring magnets being disposed coaxially of said axis and being polarized so that identical magnetic poles are formed at their confronting surfaces, whereby vibration and whip in said shaft are reduced during operation of said shaft and said agitating means.

References Cited in the file of this patent

UNITED STATES PATENTS

| | | |
|---|---|---|
| 2,195,092 | Muller | Mar. 26, 1940 |
| 2,340,781 | Wagner | Feb. 1, 1944 |
| 2,436,939 | Schug | Mar. 2, 1948 |
| 2,520,582 | Tustin | Aug. 29, 1950 |
| 2,622,707 | Faus | Dec. 23, 1952 |
| 2,747,944 | Baermann | May 29, 1956 |
| 2,856,239 | Dacus | Oct. 14, 1958 |
| 2,871,449 | Peltola | Jan. 27, 1959 |